Figure 1:
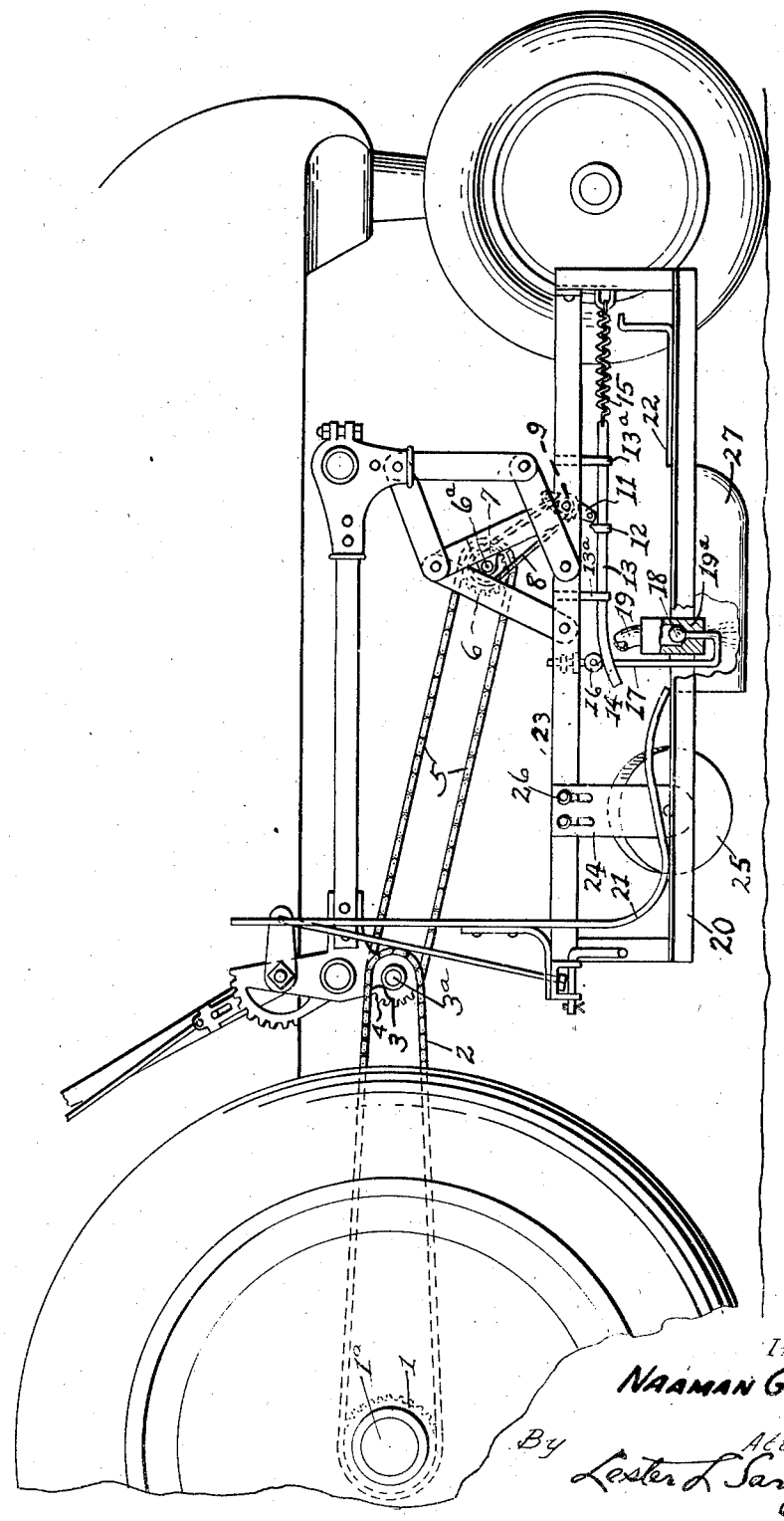

June 24, 1947. N. G. HERSHEY 2,422,832
TRANSPLANTER
Filed Aug. 6, 1945 2 Sheets-Sheet 1

Inventor
NAAMAN G. HERSHEY
By Lester L. Sargent
Attorney

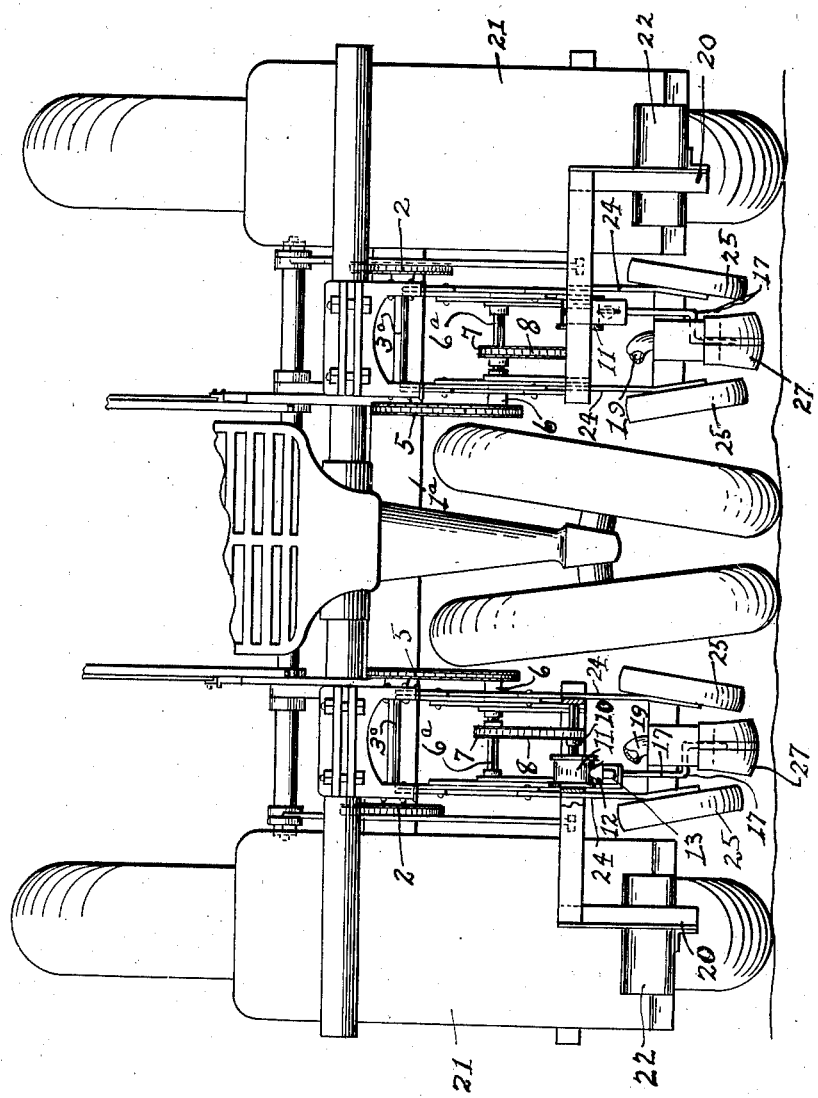

Patented June 24, 1947

2,422,832

UNITED STATES PATENT OFFICE 2,422,832

TRANSPLANTER

Naaman G. Hershey, Manheim, Pa.

Application August 6, 1945, Serial No. 609,133

1 Claim. (Cl. 111—3)

The object of my invention is to make improvements on the transplanter disclosed in Patent 2,230,643, patented February 4, 1941, to Lester H. Hershey, and particularly to provide a more direct drive and to provide means for controlling the release of water to the transplanted plants at more exact periods than is possible with the original construction of the transplanter shown in Patent 2,230,643. I attain these and other objects of my invention by the mechanism illustrated in the accompanying drawings, in which—

Fig. 1 is a side elevation of the invention showing my new improvements, a portion being shown in vertical section, and Fig. 2 is a front elevation of the invention, portions of one side of the machine being broken away and shown in section.

Like numerals designate like parts in each of the drawings.

Referring to the accompanying drawings, I provide a gear, 1 mounted on the rear axle 1a of the machine and operating the drive chain 2, which drives gear 3, which is mounted on shaft 3a. Also mounted on shaft 3a is a spaced gear 4, which in turn drives chain 5, which operates gear 6. Gear 6 is mounted on a shaft 6a, which also carries a gear 7. Gear 7 drives a short chain 8, which in turn drives gear 9 on shaft 10, as shown on the left-hand side of Fig. 2. The shaft 10 carries an elliptical cam 11, which engages the trip member 12 on rod 13, causing a longitudinal movement of that rod. Rod 13 is carried by brackets 13a, as shown in Fig. 1. Rod 13 has a downwardly curved rear end portion, 14. At the forward end of rod 13 is provided a spring 15, which tends to pull the rod 13 toward the front of the machine.

When rod 13 is moved rearwardly by the engagement of cam 11 with trip member 12, the downwardly curved rear end 14 which abuts against roller 16 which is attached to valve rod 17, it raises valve rod 17 and thus raises valve 18 from its seat in the water-tight nozzle 19a and releases water from pipe 19 through nozzle 19a to the furrow formed by shoe 27 where a plant has just been transplanted, the pipe being supplied with water from a conventional water tank (not shown), carried by the machine.

On each side of the transplanter are provided spaced seat-supporting frames 20, each of which carries a seat 21 of suitable shape to comfortably seat a person who deposits the plants in the furrows. Also mounted on each of the frames 20 are suitable foot-rests 22. The machine has tilted ground-packing wheels 25, to close the furrow after the plant has been transplanted, which are carried by supports, 24. The supports 24, have vertical slots 23 to permit the vertical adjustment of the supports 24 on the frame of the machine by means of bolts 26 which secure them in adjusted position.

The means for raising and lowering the entire seat-supporting frame mechanism is substantially the same as that described in Patent 2,230,643, patented February 4, 1941, to Lester H. Hershey.

The furrow on each side of the machine is opened by the furrow-forming shoes 27, which correspond with the shoes 32 of Patent 2,230,643 and which open the furrow into which the operator deposits the plants. Thereafter, the plants are watered by the automatic operation of the valve 18 at the lower end of the water pipe 19, the valve being controlled in its operation by the rod 13, which in turn is intermittently moved rearwardly by cam 11. Cam 11 is operated by short chain 8, which is driven by gear 7 on shaft 6a. Shaft 6a in turn, is driven by gear 6, which is driven by chain 5 from gear 4 to shaft 3a. Shaft 3a is driven by gear 3 and gear 3 in turn, is driven by chain 2, which is driven by gear 1, which is affixed to axle 1a.

What I claim is:

In a transplanter having an adjustable seat-supporting frame, a water pipe leading from a conventional water tank, a nozzle on the lower end of said water pipe, a valve normally closing said nozzle, vertically supported means for unseating said valve, said means carrying a roller, a rod having a downwardly turned rear end contacting with said roller, a spring to pull said rod to a forward position to permit of the valve being seated on the water-tight nozzle, a trip member carried by said rod, a cam intermittently engaging said trip member, a shaft on which said cam is mounted, a gear on said shaft, and a series of chains and gears driven from the rear axle to the wheel and actuating the gear on the shaft carrying the aforesaid cam whereby the cam is controlled in its operation by the rear axle of the transplanter.

NAAMAN G. HERSHEY.

REFERENCES CITED

The following references are of record in the file of this patent:

UNITED STATES PATENTS

| Number | Name | Date |
|---|---|---|
| 1,523,348 | Pegrim | Jan. 13, 1925 |
| 1,765,468 | Vollink | June 24, 1930 |
| 1,996,686 | Poll | Apr. 2, 1935 |
| 2,061,210 | Powell | Nov. 17, 1936 |
| 2,230,643 | Hershey | Feb. 4, 1941 |